Figure 1:
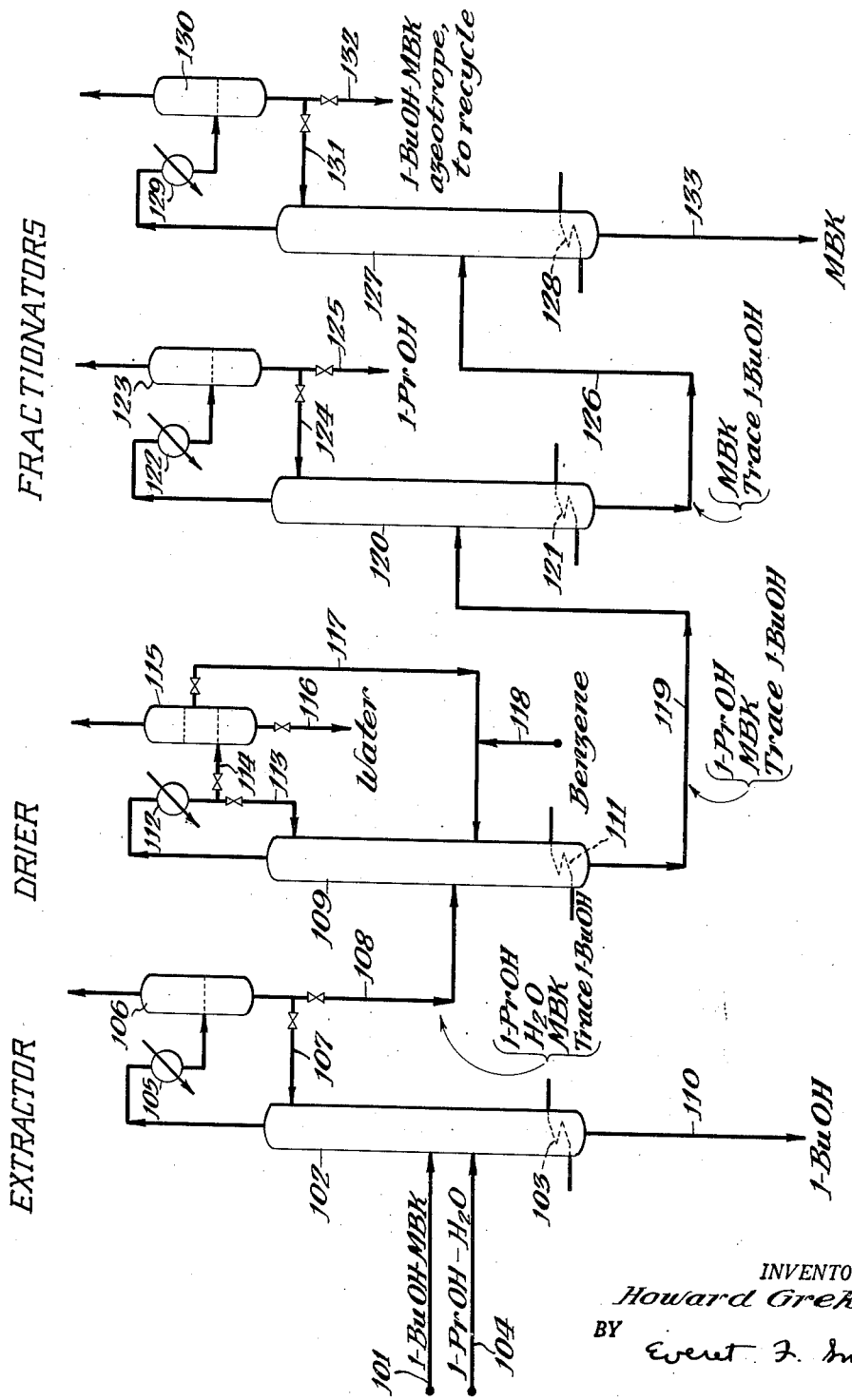

Patented June 22, 1954

2,681,882

UNITED STATES PATENT OFFICE 2,681,882

AZEOTROPIC DISTILLATION OF ALCOHOLS FROM METHYL n-BUTYL KETONE

Howard Grekel, Tulsa, Okla., assignor to Stanolind Oil and Gas Company, Tulsa, Okla., a corporation of Delaware Application May 28, 1949, Serial No. 95,977

6 Claims. (Cl. 202—42)

This invention relates to the separation and purification of organic oxygenated compounds. More particularly, it relates to the separation of 1-propanol, 1-butanol and methyl n-butyl ketone from mixtures comprised thereof.

In the production of organic oxygenated compounds by various processes, such as the oxidation of normally liquid hydrocarbons, the hydrogenation of carbon oxides, the reaction of olefins with carbon monoxide and hydrogen, and the like, products of great complexity are commonly obtained, comprising a wide variety of organic oxygenated compounds, such as alcohols, aldehydes, and ketones, of a broad range of molecular weight. For example, when carbon monoxide is hydrogenated in the presence of an alkali-promoted, fluidized iron catalyst at temperatures around 450 to 680° F. and pressures around 100 to 500 pounds per square inch, an aqueous phase and a hydrocarbon phase are produced, both rich in organic oxygenated compounds. The aqueous phase contains a high proportion of ethanol, and also substantial quantities of the other water-soluble aliphatic alcohols, as is demonstrated by the following table of data, obtained by fractional distillation of the organic materials in such an aqueous phase.

| | Per cent by weight, dry basis |
|---|---|
| Acetaldehyde | 6.9 |
| Propionaldehyde | 2.3 |
| Acetone-methanol | 11.1 |
| Butyraldehyde and ethyl acetate | 2.2 |
| Methyl ethyl ketone | 4.0 |
| Ethanol | 46.2 |
| Methyl propyl ketone | 1.1 |
| 1-propanol | 12.1 |
| Methyl n-butyl ketone | 0.1 |
| 1-butanol and heavier | 14.0 |

The isolation of individual compounds from such mixture by fractional distillation is exceedingly difficult, owing to the existence therein of numerous two-component and multicomponent azeotropic mixtures. For example, when the aqueous phase described above is fractionated, 1-propanol and methyl n-butyl ketone are distilled therefrom as an azeotropic mixture with water boiling around 87 to 87.5° C. and containing up to about 10 percent by weight of the ketone and about 27 percent by weight of water. This mixture cannot be separated into its individual components by conventional distillation.

As a further example of the difficulty of separating the individual components of complex mixtures such as the one described in the table above, I have found that 1-butanol (boiling point, 117.7° C.) cannot be separated by conventional fractional distillation from methyl n-butyl ketone (boiling point, 127.2° C.), owing to the fact that the two compounds form an azeotropic mixture boiling around 116° C. and containing approximately 19 percent by weight of the methyl n-butyl ketone.

Now, however, I have discovered that methyl n-butyl ketone can be removed substantially completely from a mixture thereof with 1-butanol by fractionally distilling the mixture in the presence of 1-propanol and water and withdrawing an azeotropic mixture of 1-propanol, water, and methyl n-butyl ketone, described above.

I have further discovered that mixtures of 1-propanol, methyl n-butyl ketone, and water may be separated and the individual constituents isolated therefrom by first removing the water and subsequently fractionally distilling the 1-propanol from the methyl n-butyl ketone.

A major object of my invention is to separate substantially pure 1-butanol and substantially pure methyl n-butyl ketone from a mixture thereof. Another object of my invention is to separate the components of a mixture of 1-propanol, 1-butanol, and methyl butyl ketone. A further object is to isolate 1-propanol, 1-butanol, and methyl n-butyl ketone as substantially pure fractions from a mixture thereof with water. A subsidiary object is to separate 1-propanol in a purified state from a mixture thereof with water and methyl n-butyl ketone. Other objects will be apparent from the following description.

In a simple embodiment of my invention, substantially pure 1-butanol is separated from a mixture of 1-butanol and methyl n-butyl ketone by the following procedure: To the mixture of 1-butanol and methyl n-butyl ketone is added a sufficient quantity of 1-propanol and water to form an azeotropic mixture with substantially all of the methyl n-butyl ketone in the charging stock. The quantities required may readily be calculated from the data given above. The mixture is then fractionally distilled, the azeotropic mixture being withdrawn overhead; and substantially pure 1-butanol is withdrawn as a bottom stream.

In another embodiment of my invention, a mixture of 1-propanol, 1-butanol, and methyl n-butyl ketone containing 1-propanol and methyl n-butyl ketone in at least 6:1 ratio by weight is separated according to the following procedure:

1. To the mixture of 1-propanol, 1-butanol, and methyl n-butyl ketone is added a sufficient quantity of water to form an azeotropic mixture with substantially all of the 1-propanol and methyl n-butyl ketone therein.

2. The resulting mixture is fractionally distilled, and substantially all of the 1-butanol is removed as the bottom stream.

3. The overhead stream from Step 2, comprising substantially all of the 1-propanol and methyl n-butyl ketone, together with water, is dried by suitable means such as by treatment with anhydrous calcium sulfate, sodium carbonate, or the like, or by azeotropic distillation with a suitable water entrainer.

4. The dry stream from Step 3, comprising 1-propanol and methyl n-butyl ketone, is fractionally distilled, and the 1-propanol is taken off overhead in substantially pure form.

5. The bottom stream from Step 4 comprises substantially pure methyl n-butyl ketone, and may be further purified if desired by fractional distillation.

The drying operation of Step 3 may be carried out conveniently and advantageously by azeotropic distillation of the water with a hydrocarbon, preferably chosen from the group having from five to seven carbon atoms in the molecule, including pentanes, pentenes, hexanes, hexenes, heptanes, heptenes, cyclopentane, methylcyclocyclohexane, methylcyclohexane, cyclohexene, cyclehexane, methylcyclohexane, cyclohexene, methylcyclohexenes, benzene, toluene, and the like. The water is taken off overhead as a heterogeneous azeotrope with 1-propanol and the entraining agent; and owing to the solubility relationships existing therein, the 1-propanol appears predominantly in the entraining-agent phase, which is returned to the still, and the aqueous phase is withdrawn with only a relatively small proportion of dissolved organic compounds.

In a further embodiment of my invention, a charging stock comprising 1-propanol, 1-butanol, methyl n-butyl ketone, and water is separated according to the following procedure:

1A. The charging stock is azeotropically dried by a fractional distillation with hexane or other $C_5$—$C_7$ hydrocarbon, substantially all of the water being removed overhead.

2A. The dry bottom stream from Step 1A, consisting essentially of 1-propanol, 1-butanol, and methyl n-butyl ketone, is fractionally distilled, and the 1-propanol is taken off overhead in substantially pure form.

3A. The bottom stream from Step 2A, consisting essentially of 1-butanol and methyl n-butyl ketone, is fractionally distilled and the binary azeotrope of 1-butanol and methyl n-butyl ketone is taken off overhead. From the bottom is withdrawn a stream of purified methyl n-butyl ketone.

4A. To the azeotrope of 1-butanol and methyl n-butyl ketone from Step 3A is added a sufficient quantity of 1-propanol and water to form an azeotropic mixture with substantially all of the methyl n-butyl ketone present therein. The materials are then fractionally distilled, and the said azeotropic mixture is withdrawn overhead, while substantially pure 1-butanol is withdrawn as the bottom stream.

5A. The azeotropic mixture of 1-propanol, water, and methyl n-butyl ketone is suitably recycled to Step 1A.

In a still further embodiment of my invention, a charging stock comprising an aqueous mixture of 1-propanol, 1-butanol, and methyl n-butyl ketone is first extracted with heptane or other $C_5$—$C_7$ hydrocarbon, in order to effect a preliminary separation of the bulk of the organic materials from the water, and thereby to reduce the size of the fractionating column required for the subsequent azeotropic drying operation. The resulting hydrocarbon solution containing 1-propanol, 1-butanol, methyl n-butyl ketone, and a reduced quantity of water may thereafter be processed as described in Steps 1A through 5A described above. In Step 5A, the azeotropic mixture of 1-propanol, water, and methyl n-butyl ketone may advantageously be recycled either to the initial extraction step, or to the azeotropic drying step.

In a further embodiment of my invention, the charging stock may also contain isobutyl alcohol, which may be fractionally distilled in substantially pure form as an overhead fraction following the distillation of substantially pure 1-propanol.

Two embodiments of my invention are illustrated in the attached flowsheets.

Figure 1 is a schematic diagram of a basic embodiment, omitting various heat exchangers, pumps, valves, and other auxiliary equipment for the sake of simplicity. A mixture of 1-butanol and methyl n-butyl ketone is introduced through line 101 into an intermediate portion of fractionator 102, equipped with reboiler 103. Also into fractionator 102 is introduced a mixture of 1-propanol and water through line 104, preferably at a point below the point at which the mixture of 1-butanol and methyl n-butyl ketone enters the column. The quantity of 1-propanol and water should be sufficient to form an azeotropic mixture with substantially all of the methyl n-butyl ketone in the charging stock. The materials entering column 102 are fractionally distilled therein, and the azeotropic mixture of 1-propanol, water, and methyl n-butyl ketone, plus a trace of 1-butanol, is taken off overhead through cooler 105 into reflux drum 106, from which a portion is refluxed to the top of fractionator 102 through valved line 107 and the remainder is withdrawn through valved line 108 and introduced into an intermediate portion of drying column 109 for further processing. A stream of dry, substantially pure 1-butanol is removed through line 110 from the bottom of fractionator 102.

In drying column 109, the azeotropic mixture of 1-propanol water, and methyl n-butyl ketone, contaminated with 1-butanol, is fractionally distilled in the presence of benzene through the action of reboiler 111, and an azeotropic mixture containing benzene, 1-propanol, and water is taken off overhead through cooler 112. A portion of the overhead stream is refluxed to the top of drying column 109 through valved line 113, and the remainder is withdrawn through valved line 114 to decanter 115. From the decanter, an aqueous phase containing only a minor proportion of organic compounds is withdrawn through valved line 116, and may be stripped, if desired, to recover the organic constituents thereof (apparatus not shown). The organic phase from decanter 115, comprising predominantly benzene and 1-propanol, is withdrawn through valved line 117 and introduced into drying column 109 preferably at a point somewhat below the point at which the azeotropic mixture of 1-propanol, water, and methyl n-butyl ketone enters the column. Make-up benzene may be supplied as required through line 118. The quantity of benzene within the system is maintained at such a level that all the water is carried overhead, but the quantity is limited so that none of the benzene escapes into and contaminates the stream emerging from the bottom of the column.

From the bottom of drying column 109 through line 119 emerges a dry stream of 1-propanol, methyl n-butyl ketone, and a minor proportion of 1-butanol. This stream is fed into fractionator 120 at an intermediate point. Heat is supplied therein by reboiler 121, and the entering stream is fractionally distilled to separate a substantially pure, dry 1-propanol overhead fraction. The 1-propanol flows through condenser 122 into reflux drum 123, from which a portion is refluxed to the top of fractionator 120 through valved line 124, and the remainder is withdrawn through valved line 125.

A stream of methyl n-butyl ketone, contaminated with a small proportion of 1-butanol, emerges from the bottom of fractionator 120 and is led through line 126 into an intermediate portion of fractionator 127, equipped with reboiler 128. Therein, the 1-butanol contaminant is removed overhead in the form of its binary azeotrope with methyl n-butyl ketone. The azeotrope is condensed in cooler 129 and lead into reflux drum 130, from which a portion is refluxed to the top of fractionator 127 through valved line 131, and the remainder is withdrawn through valved line 132. This material may suitably be recycled to fractionator 102 through line 101. From the bottom of fractionator 127 through line 133 emerges a stream of substantially pure methyl n-butyl ketone.

Figure 2:
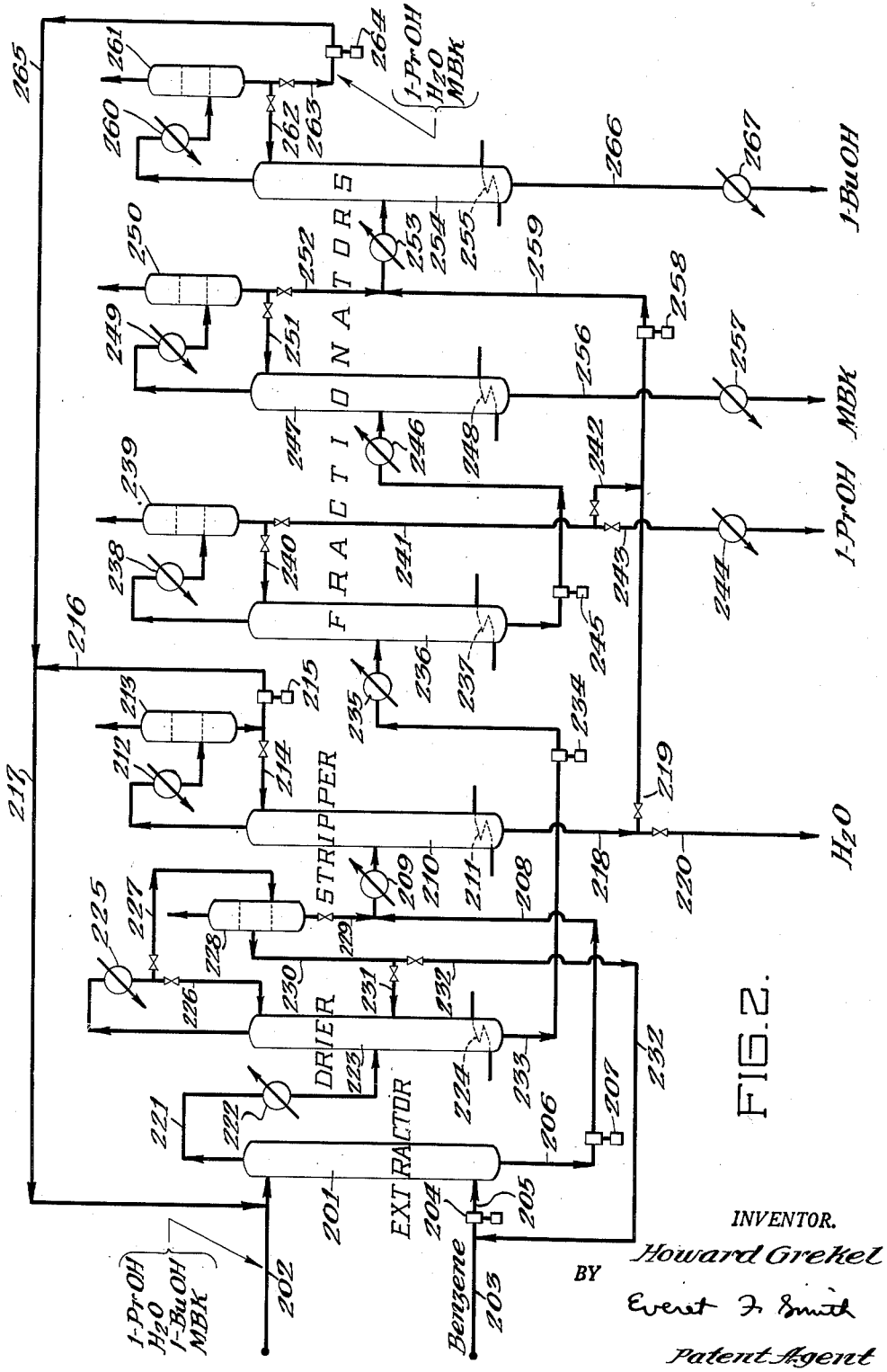

Figure 2 represents an integrated process employing my invention to separate the individual constituents of a mixture of 1-propanol, water, 1-butanol, and methyl n-butyl ketone.

Into the top of extraction column 201 through line 202 is introduced an aqeuous solution containing 1-propanol, 1-butanol, and methyl n-butyl ketone. Within the column, the aqueous solution flows downward countercurrent to a rising stream of benzene, supplied to the bottom of the column through line 203, pump 204, and line 205. Most of the organic constituents are extracted from the water stream by the benzene, and the depleted aqueous stream, containing only a minor proportion of organic constituents, emerges from the bottom of extractor 201 through line 206. This depleted aqueous stream is led by pump 207 through line 208 and heater 209 into an intermediate portion of stripper column 210, equipped with reboiler 211. Within column 210, the aqueous stream is stripped substantially free from organic compounds, the latter being taken overhead through condenser 212 into reflux drum 213, from which a portion is refluxed to the top of column 210 through valved line 214, and the remainder is withdrawn and recycled, suitably by pump 215 through lines 216, 217, and 202 to the top of extractor column 201. The depleted aqueous phase flows out of the bottom of stripper column 210 through line 218, a portion being withdrawn through valved line 219 and used elsewhere in the process, as will be described below, and the remainder being used otherwise or discarded through valved line 220.

A benzene solution of 1-propanol, 1-butanol, methyl n-butyl ketone, and water flows out of the top of extractor 201 through line 221 and is transferred through heater 222 into an intermediate portion of drying column 223, equipped with reboiler 224. From the top of column 223 an azeotropic mixture of benzene, 1-propanol, and water is distilled and condensed in cooler 225. A portion of the condensate is refluxed to the top of drying column 223 through valved line 226, and the remainder is led through valved line 227 into decanter 228. The aqueous phase therein is withdrawn through valved line 229 and led through heater 209 into stripper column 210, where it is processed as described above. The organic phase in decanter 228, comprising predominantly benzene, is withdrawn through line 230 and divided into two streams. One stream is recycled to an intermediate portion of drying column 223 through valved line 231, preferabl yat a point below the entry point of the benzene solution charged to the column. The remainder is recycled to the bottom of extractor 201 by way of valved line 232, line 203, pump 204, and line 205.

A dry mixture of 1-propanol, 1-butanol, and methyl n-butyl ketone flows from the bottom of drying column 223 through line 233, and is fed by pump 234 through heater 235 into an intermediate portion of fractionator 236, equipped with reboiler 237. An overhead stream of dry, substantially pure 1-propanol is distilled from fractionator 236 through condenser 238 into reflux drum 239, from which a portion is refluxed to the top of the column through valved line 240, and the remainder is withdrawn through valve line 241. The dry 1-propanol fraction in valved line 241 is divided into two streams, one stream being returned to process through valved line 242, as will be described below, and the other being removed through valved line 243 and cooler 244 as a purified product fraction.

From the bottom of fractionator 236 flows a mixture of 1-butanol and methyl n-butyl ketone. This mixture is led by pump 245 through heater 246 into an intermediate portion of fractionator 247, equipped with reboiler 248, and the binary azeotrope of methyl n-butyl ketone and 1-butanol is distilled overhead through condenser 249 into reflux drum 250. A portion of the overhead stream is refluxed to the top of fractionator 247 through valved line 251, and the remainder is withdrawn through valved line 252 and led through heater 253 into an intermediate section of fractionator column 254, equipped with reboiler 255. From the bottom of fractionator 247 is withdrawn a stream of purified methyl n-butyl ketone through line 256 and cooler 257.

Into an intermediate point of fractionator colum 254 is also introduced a sufficient quantity of 1-propanol and water to form an azeotropic mixture of 1-propanol, water, and methyl n-butyl ketone with substantially all of the methyl n-butyl ketone entering the column. The 1-propanol may suitably be obtained through valved line 242 from fractionator column 236, and the water may be obtained from stripper column 210 through valved line 219, the mixture thereof being fed by pump 258 through line 259 and heater 253 into fractionator 254. From the top of fractionator 254 is distilled an azeotropic mixture of 1-propanol, water, and methyl n-butyl ketone, which is condensed in cooler 260 and led into reflux drum 261. The condensate from reflux drum 261 is refluxed in part through valved line 262 to the top of fractionator column 254, and the remainder is withdrawn and suitably recycled through valved line 263, pump 264, and lines 265, 217, and 202 to the top of extractor 201. A purified stream of 1-butanol flows out of the bottom of fractionator column 254 through line 266 and cooler 267.

The proportions of the constituents of the charging stock entering extractor 201 are unimportant. Where the ratio of methyl n-butyl ketone to 1-butanol is initially less than the ratio thereof in the binary azeotrope with 1-butanol, no purified methyl n-butyl ketone bottoms will be obtained initially from fractionator 247. Instead, the methyl n-butyl ketone will be recycled from fractionator 254 to extractor 201 in the form of the azeotropic mixture with 1-propanol and water until the accumulated quantity of methyl n-butyl ketone entering the system exceeds the ratio thereof to 1-butanol in the 1-butanol binary azeotrope. At this point, a purified stream of methyl n-butyl ketone will appear at the bottom of fractionator 247.

My invention will be more fully understood from the following specific examples:

Example I

An aqueous phase obtained in the hydrogenation of carbon monoxide in the presence of a fluidized, alkali-promoted iron catalyst was fractionally distilled to remove therefrom substantially all of the ethanol and lower-boiling materials as a distillate fraction. The resulting two-phase distillation bottoms were separated and analyzed, and the organic phase, after being neutralized and washed free from acid salts, was found to have the following approximate composition by weight:

|  | Per cent |
|---|---|
| 1-propanol | 17 |
| Isobutanol and 1-butanol | 46 |
| Pentanols and heavier | 12 |
| Methyl n-butyl ketone | 3.9 |
| Water | 21 |

A mixture having the foregoing composition was fractionally distilled and an aqueous azeotropic distillate was withdrawn containing substantially all the 1-propanol and methyl n-butyl ketone initially present therein. On continuing the distillation, a 1-butanol fraction was distilled containing 0.29 percent by weight of methyl n-butyl ketone.

Example II

A mixture measuring 1000 milliliters and containing by weight 65 percent 1-propanol, 1.24 percent methyl n-butyl ketone, 3 percent mixed isobutanol and 1-butanol, and 31 percent water was commingled in a distillation flask with 200 milliliters of benzene, and the total mixture was fractionally distilled through a Stedman column at about 740 mm. Hg. The first distillate fraction, boiling at 67.2° C. and containing predominantly benzene with some water and 1-propanol, was allowed to stratify, and the phases were separated. A 71-milliliter sample of the initial organic phase was removed for analysis, and thereafter all the organic phase was refluxed to the distillation column. The aqueous phase, measuring a total of 302 milliliters, was withdrawn. Both the organic phase and the aqueous phase were found to be free from ketone. After water had ceased distilling overhead, the benzene remaining in the flask was distilled off as a 1-propanol-benzene binary azeotrope, boiling at 77° C. and measuring 103 milliliters, and this fraction also was found to be free from ketone. Subsequently, a substantially pure, ketone free 1-propanol fraction measuring 545 milliliters was distilled at 96.2 to 96.7° C. The distillation flask was then transferred to a Podbielniak column and the distillation was continued. A 1-propanol-isobutanol intermediate measuring 34.5 milliliters was distilled at 97.6 to 106° C. and found to be free from ketone. Thereafter, 27.7 milliliters of pure, ketone-free isobutanol was distilled at 106 to 109° C. The distillation bottoms measured 30 milliliters and contained 5.6 grams of methyl n-butyl ketone.

Example III

A mixture measuring 500 milliliters and containing by weight about 49 percent 1-propanol, 1.15 wt. percent methyl n-butyl ketone, 3 percent mixed isobutanol and 1-butanol, and 47 percent water was commingled in a distillation flask with 230 milliliters of hexane, and the total mixture was carefully distilled through a Fenske column at a pressure of about 740 mm. Hg. The first distillate fraction, boiling at 59.6 to 60° C. and containing predominantly hexane with some water and 1-propanol, was allowed to stratify, the phases were separated, and the aqueous phase was withdrawn. A 59-milliliter sample of the initial organic phase was withdrawn for analysis, and thereafter all organic phase was refluxed to the distillation column. The organic-phase sample and all of the 214 milliliters of aqueous phase subsequently withdrawn were found to be free from ketone. After all of the water had been removed from the still, the hexane remaining therein was distilled as a binary azeotrope with 1-propanol, boiling from 64 to 65° C. and measuring 43 milliliters. This fraction also was free from ketone. Subsequently, a pure, ketone-free 1-propanol fraction measuring 80 milliliters was distilled at 96 to 96.5° C. The distillation bottoms contained 3.47 grams of methyl n-butyl ketone.

Example IV

A mixture of 1-propanol, methyl n-butyl ketone, and water, measuring 450 milliliters and containing 46.8 milliequivalents of the ketone and 44 percent by volume of water, was commingled with 90 milliliters of heptane, and the total mixture was carefully distilled through a Fenske column. The distillate stream, comprising predominantly heptane and water, was allowed to stratify, and the phases were separated. The organic phase was refluxed to the distillation column. The aqueous phase, measuring a total of 327.3 milliliters, was withdrawn and found to be free from ketones. Subsequently, the residual dry mixture was further distilled, and the following fractions were obtained:

| Fraction | Volume, ml. | Index of Refraction, $n_D^{20}$ |
|---|---|---|
| 1 | 3.2 | 1.3861 |
| 2 | 4.6 | 1.3869 |
| 3 | 3.0 | 1.3873 |
| 4 | 4.5 | 1.3881 |
| 5 | 4.7 | 1.3886 |
| 6 | 5.9 | 1.3898 |
| 1-Propanol (literature) |  | 1.3854 |

The distillation residue measured 135 milliliters, and contained 45.3 milliequivalents of methyl n-butyl ketone. This represents 97 percent rejection of the ketone in the distillation bottoms.

Example V

The following example illustrates the removal of 1-butanol from a mixture of 1-butanol and methyl n-butyl ketone by a distillation in which the binary azeotrope of 1-butanol and methyl n-butyl ketone is removed, leaving a residue of purified methyl n-butyl ketone. In this experiment, a mixture composed of 70 milliliters (56.9 grams) of the ketone and 50 milliliters (40.5 grams) of 1-butanol was carefully distilled in a Fenske column at an atmospheric pressure of about 740 millimeters of mercury. Distillate fractions were analyzed for the ketone. The data are summarized below.

| Distillate Fraction | Still Head Temperature (° C.) | Weight of Fraction (grams) | Density at 20° C. (g./ml.) | Methyl n-Butyl Ketone Content (wt.-percent) | 1-Butanol Content (grams) |
|---|---|---|---|---|---|
| 1 | 112–114 | 5.3 | | | 4.3 |
| 2 | 114–115 | 7.6 | 0.839 | 19.0 | 6.2 |
| 3 | 115–116 | 3.8 | | 19.3 | 3.1 |
| 4 | 116–117 | 8.8 | 0.838 | 20.7 | 7.0 |
| 5 | 116–117 | 8.8 | | 21.4 | 6.9 |
| 6 | 116–117 | 9.7 | 0.838 | 24.8 | 7.3 |
| 7 | 117–120 | 7.6 | | 37.3 | 4.8 |
| 8 | 120–126 | 6.8 | | 86.0 | 1.0 |
| 9 | 126–126.5 | 8.4 | | 99.0 | 0.1 |
| 10 | 126–126.5 | 8.5 | | 100.0 | 0.0 |
| | | | | | 40.7 |

While I have described my invention with reference to certain specific embodiments thereof, it will be understood that I am not limited thereto. It is further to be understood that I may use any of the apparatus, techniques, and procedures conventionally employed in the chemical and chemical engineering arts in adapting and applying my invention within the scope of my disclosure and claims. In general, it may be said that any modifications or equivalents of my invention that would occur to one skilled in the art are to be considered as lying within the scope of my invention.

In accordance with the foregoing description, I claim as my invention:

1. A process for separating 1-butanol from a mixture thereof with methyl n-butyl ketone which comprises adding 1-propanol and water to said mixture in an amount such that the weight ratio of 1-propanol to methyl n-butyl ketone is at least 6:1, distilling therefrom substantially all of said methyl n-butyl ketone as an azeotropic mixture with 1-propanol and water, and withdrawing purified 1-butanol as a bottom stream.

2. In a process for separating the components of a mixture of 1-propanol, 1-butanol, and methyl n-butyl ketone wherein the weight ratio of 1-propanol to methyl n-butyl ketone is at least 6:1, the steps which comprise distilling said mixture in the presence of water, withdrawing 1-butanol as a bottom fraction and a mixture of 1-propanol, methyl n-butyl ketone, and water as an overhead fraction, drying said overhead fraction, and fractionally distilling 1-propanol from the resulting dry mixture.

3. In a process for separating the components of a mixture of 1-propanol, 1-butanol, and methyl n-butyl ketone wherein the weight ratio of 1-propanol to methyl n-butyl ketone is at least 6:1, the steps which comprise distilling said mixture in the presence of water, withdrawing 1-butanol as a bottom fraction and a mixture of 1-propanol, methyl n-butyl ketone, and water as an overhead fraction, azeotropically drying said overhead fraction with a hydrocarbon having from five to seven carbon atoms in the molecule, and fractionally distilling 1-propanol from the resulting dry mixture.

4. The process of claim 3 wherein said hydrocarbon is benzene.

5. The process of claim 3 wherein said hydrocarbon is hexane.

6. The process of claim 3 wherein said hydrocarbon is cyclohexane.

References Cited in the file of this patent

UNITED STATES PATENTS

| Number | Name | Date |
|---|---|---|
| 1,862,706 | Ricard et al. | June 14, 1932 |
| 2,392,534 | Van Keussler | Jan. 8, 1946 |
| 2,476,788 | White | July 19, 1949 |
| 2,500,329 | Steitz, Jr. | Mar. 14, 1950 |